3,630,898
PRODUCT AND PROCESS

Ford C. Teeter, Palos Heights, Ill., David B. Sheldahl, Griffith, Ind., and Barnard C. Creech, Homewood, Ill., assignors to Atlantic Richfield Company, New York, N.Y.
No Drawing. Continuation-in-part of application Ser. No. 632,190, Apr. 20, 1967. This application Jan. 9, 1970, Ser. No. 1,875
Int. Cl. C10m *1/32*
U.S. Cl. 252—34.7       24 Claims

ABSTRACT OF THE DISCLOSURE

A lubricating composition which is essentially biodegradable and dispersible in water and made from about 1 to 77 weight percent of water; about 2 to 50 weight percent of an olefinically-unsaturated fatty acid having 10 to 32 carbon atoms (e.g. oleic acid); about 1 to 50 weight percent of a water-soluble alkanol amine (e.g. ethanolamine); about 0 to 90 weight percent of an alcohol (e.g. ethylene glycol); and about 1 to 30 weight percent of an ester of a polyethylene glycol and an olefinically-unsaturated fatty acid having 10 to 32 carbon atoms (e.g. a monoleate of a polyethylene glycol of about 400 molecular weight).

---

This application is a continuation-in-part application of our copending application Ser. No. 632,190, filed Apr. 20, 1967, now abandoned.

This invention relates to improved water-containing fluid compositions that are biodegradable. More particularly, this invention pertains to novel water-containing lubricants and coolants having improved properties and which contain components that are essentially completely degradable by microorganisms common to waste-treatment systems.

Lubricants and coolants in industrial use today for a variety of operations, such as cutting, extruding, machining and forming metals, glass, etc., often called soluble or emulsifiable oils, generally contain a petroleum oil base compounded with emulsifiers and coupling agents to effect stable emulsions when mixed with large amounts of water. Anionic emulsifiers, such as sodium mahagony sulfonates are most often used due to the higher cost of the non-ionic type emulsifiers. Good emulsion stability has been effected in glass processing and metal-working applications when anionic emulsifiers are employed in the soluble or emulsifiable oil compositions. In fact, the quality of good emulsion stability has created disposal problems of the used emulsions especially in industries where large volumes of the oils are employed. The problem is especially acute in the glass industry, for example, where soluble oil emulsions are used to lubricate shears and troughs of glass manufacturing equipment at highly dilute concentrations, and the emulsions are used in a single application only, and are not recirculated as is common in other industries. Glass plants customarily have disposed of their used emulsion effluents by running them directly into natural streams. Recent legislation and public interest in pollution abatement will make it necessary, if plants continue to use conventional petroleum-based soluble oils, to employ expensive and impractical processes of breaking the emulsions with acids or salts to remove the oil before depositing the effluents in the streams. Alternatively, the effluents can be economically deposited into sanitary sewers. However, it was found that conventional soluble oil emulsions containing petroleum oil and other non-biodegradable substances caused the activated sludge of the sewage disposal plant to be made inactive.

Fluid compositions have been found which are suitable for use as aqueous dispersions in various types of industrial processing and metal working applications and which in essence are completely biodegradable and can be economically disposed of after use by direct transferral to a waste-treatment system. Often, however, when such compositions are used in an industrial operation which requires that the composition be dispersed in relatively large amounts of water, for instance, in glass lubricating operations wherein one part of the composition may be employed as a dispersion in about 100 to 300 parts or more of water, hard water soaps or curds may be formed which may clog spray nozzles frequently employed in the distribution of the aqueous dispersions.

We have now found a fluid composittion which is in essence completely biodegradable and can be used in various industrial applications which require that the composition be employed as a dispersion in large amounts of water without encountering the formation of appreciable amounts of hard water soaps or curds. The fluid composition of the invention is made from about 2 to 50, preferably about 10 to 40, weight percent of an olefinically-unsaturated fatty acid having 10 to 32 carbon atoms, about 1 to 50, preferably about 5 to 25, weight percent of a water-soluble alkanol amine, the acid and amine serving to provide at least about 3 weight percent of their salt, about 0 to 90, preferably about 15 to 50, weight percent of an alcohol, about 1 to 30, preferably about 1 to 10, weight percent of a polyoxyethylene ester and about 1 to 77, preferably about 20 to 65, weight percent of water. The exact proportions of each component may vary depending upon the particular machinery operation or industrial process in which the composition is employed. Generally, the amount of the olefinically-unsaturated fatty acid salt should not exceed that which maintains the fluidity of the composition, e.g. often up to about 60% by weight; but in any event the salt is at least about 3 weight percent of the composition. Thus the composition may contain free acid or base. The alkanol amine is often used in an amount of at least about 125% of that needed to neutralize the acid and this excess may impart anti-corrosive properties to the composition.

The acid component used in the composition of the present invention is an olefinically-unsaturated fatty acid having about 10 to 32 carbon atoms. Suitable acids thus include acids such as oleic, linoleic, linolenic, ricinoleic, etc.

In general, water-soluble alkanol amines having the following structural formula may be used as the base component in this invention:

$$R_mNH_n$$

wherein R is a hydroxyalkyl group of 2 to 12, preferably 2 to 4, carbon atoms, $m$ is 1 to 3 and $n$ is 0 to 2. Some examples of the amines that may be used in the compositions of the invention include monomethanolamine, monoethanolamine, monobutanolamine, diethanolamine, triethanolamine, etc.

The alcohol component of the composition of the invention may be included, for example, to prevent freezing and is further important when preparing the composition as discussed below. Suitable alcohols, including glycols and glycol ethers, are water-soluble in the amounts used and may often contain 1 to about 25 carbon atoms. Some examples of alcohols that may be used in the composition of the invention include alkanols, such as methanol, ethanol, n-propanol, isopropanol, n-butanol, isobutanol, sec-butanol, tert-butanol, etc.; glycols, such as ethylene glycol, propylene glycol, 1,3-propane-diol, 1-,2-butanediol, 2,3-butanediol, 1,4-butanediol, pinacol, etc.; polyols, such as glycerol, erythritol, pentaerythritol, ribitol, sorbitol, etc.; alkoxyalcohols, for example, the hydroxy ethers, such as, methoxymethanol, 1-methoxyethanol, 2-methoxyethanol, 1-ethoxyethanol, 2-ethoxyethanol, 2-ethoxypropanol, 2-ethoxybutanol, diethylene glycol, triethylene glycol, etc.; polyether glycols, e.g. polyethylene glycols, of up to about 750 or more molecular weight; and like compounds.

The polyoxyethylene esters employed in the composition of the invention include monoesters and diesters of polyoxyethylene glycols (herein also referred to as polyethylene glycols) of up to about 5000, preferably about 200 to 1000, molecular weight and an olefinically-unsaturated fatty acid having about 10 to 32 carbon atoms, which esters are water-soluble in the amounts used. The acids which are suitable for preparing the polyoxyethylene esters component of the composition of the invention include acids such as oleic, linoleic, linolenic, ricinoleic, etc. The preferred polyoxyethylene esters are the water-soluble monoesters of the above polyethylene glycols and olefinically-unsaturated fatty acids, and include, for example, monooleates, monolinoleates, monoricinoleates, etc., of such glycols.

In use as water dispersed lubricants or coolants the compositions of this invention may be dispersed in the desired amount of water, often about 5 to 400 or more parts of water, depending upon the particular application contemplated. The composition of the invention is especially useful for lubricating solid, e.g. metal, surfaces in contact with molten glass by providing a lubricating amount of an aqueous dispersion of the composition between the surface and the glass. For example, in use as a glass working fluid one part of the lubricant composition for approximately each 100 to 400 parts of water, preferably for approximately each 300 parts of water, may be used to obtain satisfactory results.

It may be desirable to add to our compositions a small amount, say about 0.1 to 5% by weight, of other ingredients such as anti-foam agents, anti-wear additives, biocides, preservatives, anti-gelling agents, metal deactivators, etc. If such additives be incorporated, they should be biodegradable, especially in a sanitary sewage treating system.

In preparing the composition of the invention, it is highly desirable to combine at least 20 weight percent based upon the total weight of the composition, of the alcohol component, the polyoxyethylene ester, the olefinically-unsaturated fatty acid and the amine prior to the addition of the water, which enables simple stirring of the mixture. A thick phase requiring elaborate and heavy duty mixing apparatus results, it was found, if the water is added directly to the polyoxyethylene ester, acid and amine components before the alcohol. The alcohol component and preformed olefinically-unsaturated fatty acid-amine salt, containing any excess of either the acid or the amine, may be combined by mixing at a temperature of about 65° to 140° F. Alternatively, the olefinically-unsaturated fatty acid-amine salt may be prepared in situ at the same temperature range and this is the preferred method. Our invention is specifically illustrated by the following example.

EXAMPLE

A 10,000–12,000 pound batch of the fluid composition of the invention was prepared by the following procedure. When preparing smaller or larger batches it may be necessary to vary the rates of addition, mixing times, etc., accordingly.

| Blending sequence | Composition | Weight percent |
|---|---|---|
| 1 | Ethylene glycol | 25.0 |
| 2 | Polyethylene glycol 400 monooleate | 5.0 |
| 3 | Monoethanolamine | 10.0 |
| 4 | Metal deactivator | 0.5 |
| 5 | Oleic acid | 20.0 |
| 6 | Water | 2.0 |
| 7 | Antifoam agent | 0.2 |
| 8 | Water | 37.3 |

Step 1—Blend ethylene glycol, polyethylene glycol 400 monooleate and monoethanolamine at 130–140° F.
Step 2—Add metal deactivator to mix.
Step 3—Add oleic acid at the rate of about 100 gallons a minute, stirring rapidly. Let temperature fall.
Step 4—Stir for an additional 20 minutes.
Step 5—Disperse Dow Corning Antifoam AF Emulsion separately in a small volume of water (blending sequence No. 6) and blend thoroughly into the above mixture.
Step 6—Add balance of water at rate of about 100 gallons a minute stirring rapidly and recirculating if possible. Stir in additional 30 minutes.

All of the materials that are added after Step 1 were at a temperature above 65° F. Also the product was homogenous before the water was added.

The antifoam agent used in the above example was "Antifoam AF" a 30% active silicone de-foaming agent applied in an emulsion and well known in the art. It contains dimethylpolysiloxane, silica, stearate emulsifiers, sorbic acid and water. It is dispersible in water, has a specific gravity (60/60° F.) of 1.002–1.014 and a silicon content of 11.2 to 11.6%. The metal deactivator employed was benzotriazole.

The fluid composition prepared above was subjected to a biodegradability test, using a simulated activated sludge system. A 14 liter New Brunswick MicroFerm fermentor was used to simulate an activated sludge sewage treatment system. Activated sludge and raw sewage were obtained from a local disposal plant. The synthetic sewage used in all tests was prepared as follows:

Synthetic sewage [1]

Bacto peptone—3.5 gm.
NaCl—3.0 gm.
$K_2HPO_4$—0.5 gm.
$MgSO_4 \cdot 7H_2O$—0.2 gm.
Raw sewage—1 liter
Deionized water—11 liters

[1] (Huddleston, R. L., and Allred, R. C.—"Evaluation of Detergent Degradation Using Activated Sludge," J. Am. Oil Chemists, 41 (11) 732–735, November 1964).

Ten liters of synthetic sewage containing between 2000 to 3000 mg./liter (dry weight) activated sludge as recommended for normal sewage plant operation were added to the fermentor. The temperature was held at 25° C. and the air flow controlled at approximately one liter per minute. Slight mixing (100 r.p.m.) was used to keep the sludge in suspension during operation. Retention time in the system was limited to six hours. At the end of this period, air flow and mixing were discontinued and the sludge allowed to settle. The clear water was siphoned off and fresh synthetic sewage added. Approximately 1.5 liters of sludge remained in the fermentor after the clear effluent was removed. Samples were collected initially, at three and at six hours. Chemical and biochemical oxygen demand determinations were made on clear supernate from each sample, employing the procedures outlined in "Standard Methods for the Examination of Water and Wastewater" American Public Health Association, Inc., 1965.

Two such runs were made. The first run was made without our novel fluid composition added in order to obtain information on sludge activity.

Results presented in Table II demonstrate the complete degradation of the fluid composition as indicated by COD and BOD (chemical and biochemical oxygen demand) determinations. These procedures are routinely used by disposal plant operators to determine the quality of their effluent. Run 1 demonstrates the effectiveness of the system in handling synthetic sewage. The fluid composition added to the system in run 2 only slightly increased the initial COD and BOD. After six hours exposure the levels had been reduced to close to that of the first run.

TABLE II

[Disposal of the fluid composition in a simulated activated sludge system]

| Exposure time (hours) | Chemical oxygen demand (COD) p.p.m.[1] | | | Five day biochemical oxygen demand (BOD) p.p.m.[2] | | |
|---|---|---|---|---|---|---|
| | 0 | 3 | 6 | 0 | 3 | 6 |
| Run Number: | | | | | | |
| 1. No fluid composit | 312 | | 83 | 280 | | 63 |
| 2. Fluid composition added [4] | [3]407 | 209 | 99 | [3]320 | 167 | 80 |

[1] Chemical oxygen demand is the amount of dichromate oxidizable material in a water or sewage sample. It is reported as mg./liter (p.p.m.) of dichromate oxygen utilized.
[2] Biochemical oxygen demand is an estimate of the quantity of oxygen required by bacteria (during a five day incubation period) to oxidize, or render stable, the more easily decomposable organic substances in a water or sewage sample. It is reported as mg./liter (p.p.m.) of oxygen utilized.
[3] These determinations are low due to absorption of the fluid composition on the activated sludge.
[4] 3.3 percent solution in tap water.

The fluid composition prepared above was subjected to rust and wear tests. For comparison, a soluble oil composition containing petroleum oil which is representative of the fluids often used in industry was subjected to the identical tests. The results listed in Table II demonstrate the superiority of the fluid composition of the present invention in inhibiting rust and wear.

TABLE III

| Product | Dilution | Cast iron chip rust test [1] | Shell four ball wear test (scar diameter, mm.)[2] |
|---|---|---|---|
| Fluid composition | 1:100 | No rust | |
| | 1:150 | | .400 |
| | 1:200 | No rust | |
| | 1:300 | Medium | .436 |
| Soluble oil | 1:100 | Trace | |
| | 1:150 | | .656 |
| | 1:200 | Light | |
| | 1:300 | Medium | .816 |

[1] This is a standard test often used for testing rust inhibiting properties of soluble oil emulsions. It consists of immersing cast iron chips in test emulsion in a beaker; covering with a watch glass; inverting and allowing emulsion to drain while chips remain covered on the watch glass by the beaker. Chips are observed for rust after 24 hours.
[2] Test conditions: 1,800 r.p.m., 5 kg., 1 hour, at 130° F.

It is claimed:
1. A water-dispersible, biodegradable fluid composition of about 2 to 50 weight percent of an olefinically-unsaturated fatty acid having about 10 to 32 carbon atoms, about 1 to 50 weight percent of a water-soluble alkanol amine, said amine having the structure $R_mNH_n$ wherein R is hydroxyalkyl of about 2 to 12 carbon atoms, $m$ is 1 to 3 and $n$ is 0 to 2, said acid and amine serving to provide at least about 3 weight percent of their salt, about 0 to 90 weight percent of a water-soluble alcohol, about 1 to 30 weight percent of a water-soluble ester of polyethylene glycol of up to about 5000 molecular weight and an olefinically-unsaturated fatty acid having about 10 to 32 carbon atoms, and about 1 to 77 weight percent of water.
2. The composition of claim 1 wherein the amine is an ethanol amine.
3. The composition of claim 2 wherein the alcohol is ethylene glycol.
4. The composition of claim 3 wherein the acid component used to prepare the salt is oleic acid.
5. The composition of claim 1 wherein the ester is a monoester of a polyethylene glycol of about 200 to 1000 molecular weight and oleic acid.
6. The composition of claim 5 to which is added about 0.1 to 5 weight percent of benzotriazole.
7. A water-dispersible, biodegradable fluid composition of about 10 to 40 weight percent of an olefinically-unsaturated fatty acid having about 10 to 32 carbon atoms, about 5 to 25 weight percent of a water-soluble alkanol amine, said amine having the structure $R_mNH_n$ wherein R is hydroxyalkyl of about 2 to 12 carbon atoms, $m$ is 1 to 3 and $n$ is 0 to 2, said acid and amine serving to provide at least about 3 weight percent of their salt, about 15 to 50 weight percent of a water-soluble alcohol, about 1 to 10 weight percent of a water-soluble ester of polyethylene glycol having a molecular weight of about 200 to 1000 and an olefinically-unsaturated fatty acid having about 10 to 32 carbon atoms and about 20 to 65 weight percent of water.
8. The composition of claim 7 wherein the amine is an ethanol amine.
9. The composition of claim 8 wherein the acid component used to prepare the salt is oleic acid.
10. The composition of claim 9 wherein the ester is a monoester of a polyethylene glycol of about 400 molecular weight and oleic acid.
11. The composition of claim 10 wherein the alcohol is ethylene glycol.
12. The composition of claim 11 to which is added about 0.1 to 5 weight percent of benzotriazole.
13. A method of lubricating a solid surface in contact with molten glass which comprises providing, between said surface and said glass, an aqueous dispersion of a composition of an olefinically-unsaturated fatty acid having about 10 to 32 carbon atoms, about 1 to 50 weight percent of a water-soluble alkanol amine having the structure $R_mNH_n$ where R is hydroxyalkyl of at least 2 to 12 carbon atoms, $m$ is 1 to 3 and $n$ is 0 to 2, said acid and amine serving to provide at least about 3 weight percent of their salt, about 0 to 90 weight percent of a water-soluble alcohol, about 1 to 30 weight percent of a water-soluble ester of polyethylene glycol of up to about 5000 molecular weight and an olefinically-unsaturated fatty acid having about 10 to 32 carbon atoms, 0 to 90 weight percent of a water-soluble alcohol, and about 1 to 77 weight percent of water.
14. The method of claim 13 wherein the amine is an ethanol amine.
15. The method of claim 14 wherein the alcohol is ethylene glycol.
16. The method of claim 15 wherein the acid component used to prepare the salt is oleic acid.
17. The method of claim 13 wherein the ester is a monoester of a polyethylene glycol of about 200 to 1000 molecular weight and oleic acid.
18. The method of claim 17 wherein about 0.1 to 5 weight percent of benzotriazole is added to the composition.
19. A method of lubricating a solid surface in contact with molten glass which comprises providing, between said surface and said glass, an aqueous dispersion of a composition consisting essentially of about 10 to 40 weight percent of an olefinically-unsaturated fatty acid having about 10 to 32 carbon atoms, about 5 to 25 weight percent of a water-soluble alkanol amine containing about 2 to 12 carbon atoms, about 20 to 50 weight percent of a water-soluble alcohol, about 1 to 10 weight percent of a water-soluble ester of a polyethylene glycol having a molecular weight of about 200 to 1000 and an olefinically-unsaturated fatty acid having about 10 to 32 carbon atoms, and about 20 to 65 weight percent of water.
20. The method of claim 19 wherein the base is an ethanol amine.
21. The method of claim 20 wherein the alcohol is ethylene glycol.
22. The method of claim 21 wherein the acid component used to prepare the salt is oleic acid.
23. The method of claim 22 wherein the acid component of the water-soluble ester is oleic acid.

24. The method of claim 22 wherein about 0.1 to 5 weight percent of benzotriazole is added to the composition.

References Cited

UNITED STATES PATENTS

| | | | |
|---|---|---|---|
| 3,265,620 | 8/1966 | Heiman | 252—49.3 X |
| 3,336,225 | 8/1967 | Sayad et al. | 252—49.3 X |
| 3,071,545 | 1/1963 | Davis et al. | 252—49.3 X |
| 3,341,454 | 9/1967 | Chor et al. | 252—49.5 X |
| 3,507,791 | 4/1970 | Teeter et al. | 252—49.3 X |

FOREIGN PATENTS

| | | | |
|---|---|---|---|
| 833,868 | 4/1960 | Great Britain | 252—49.3 |

OTHER REFERENCES

Perlman, "Detergent Biodegradability," Soap and Chemical Specialties, September 1963, pp. 68–70; 206 and 207.

McCutcheon, "Detergents and Emulsifiers," 1967 Annual, p. 104.

DANIEL E. WYMAN, Primary Examiner

W. H. CANNON, Assistant Examiner

U.S. Cl. X.R.

252—49.3